No. 831,737. PATENTED SEPT. 25, 1906.
J. L. NIX.
HOVER.
APPLICATION FILED JULY 17, 1905.

2 SHEETS—SHEET 1.

Witnesses
M. M. Brazill
L. A. L. McIntyre

Inventor
James Love Nix
by Hopkins & Eicks Attys

No. 831,737. PATENTED SEPT. 25, 1906.
J. L. NIX.
HOVER.
APPLICATION FILED JULY 17, 1905.

2 SHEETS—SHEET 2.

UNITED STATES PATENT OFFICE.

JAMES LOVE NIX, OF HOMER CITY, PENNSYLVANIA.

HOVER.

No. 831,737.     Specification of Letters Patent.     Patented Sept. 25, 1906.

Application filed July 17, 1905. Serial No. 270,107.

*To all whom it may concern:*

Be it known that I, JAMES LOVE NIX, a citizen of the United States, and a resident of Homer City, in the county of Indiana, Pennsylvania, have invented certain new and useful Improvements in Hovers, of which the following is a specification.

My invention relates to an improved hover, and has for its object to provide a hover capable of use in indoor brooding systems, outdoor brooding systems, or colony brooding systems in which the degree of heat is subject to accurate control and which is readily knocked down for transportation or removal and as readily reassembled for installation and use.

Figure 1:
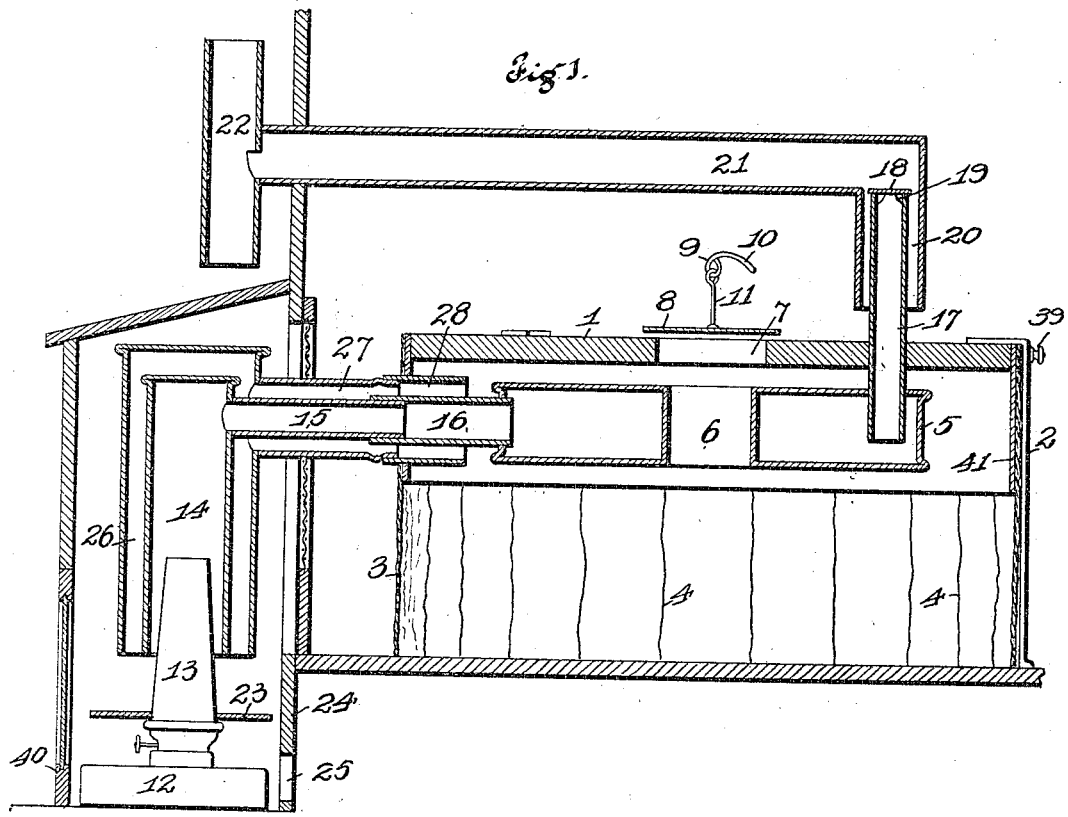
Figure 2:
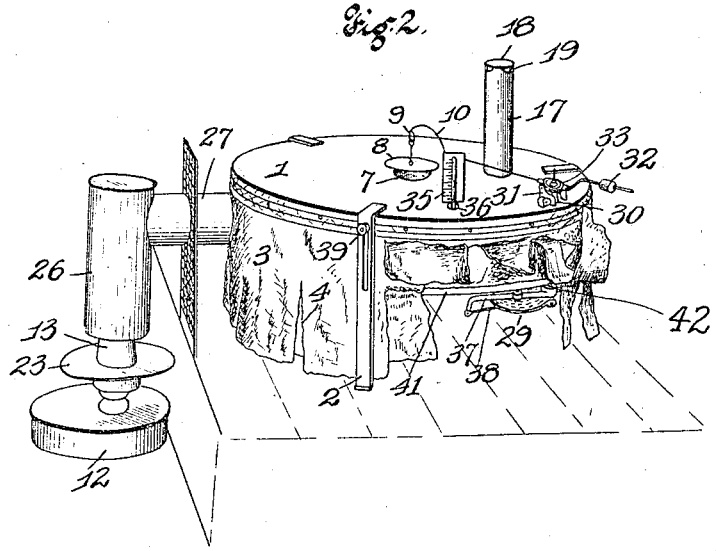
Figure 3:
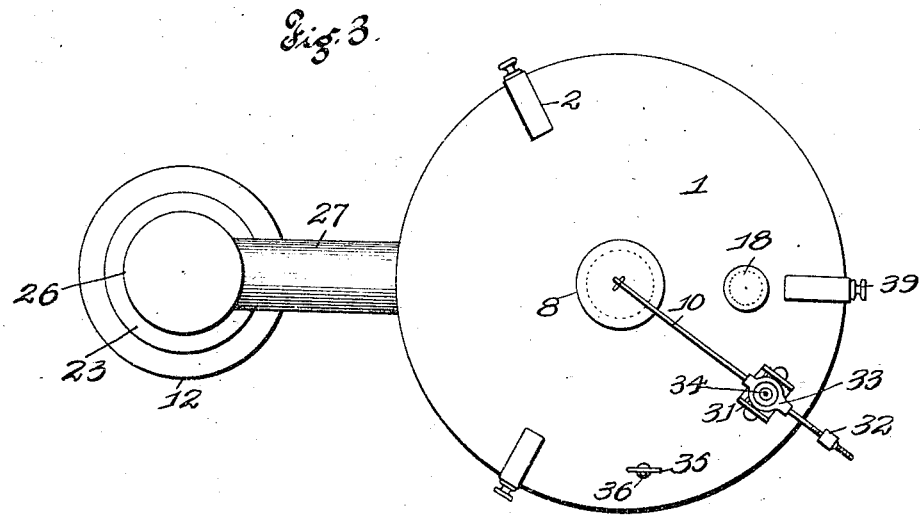

In the drawings, Figure 1 is a vertical view in mid-section of the device of my invention. Fig. 2 is a perspective view of the same. Fig. 3 is a top plan view of my invention.

I provide a hover-top 1, shown in the drawings as being cylindrical, but whose form is immaterial. The top 1 is supported by standards 2 and has suspended about its outer edge the curtain 3, which is slashed vertically from its lower edge, as indicated by the numeral 4, to admit ready ingress and egress for the chicks. Beneath the top 1 I provide the drum 5, having a vertical draft-opening 6. In vertical alinement with the draft-opening 6 the top 1 is provided with the opening 7, which in turn is controlled by the damper 8, loosely suspended from a loop 9 at the inner end of the bar 10 by the link 11.

The heat-supply indicated in the drawings is the lamp 12, having the chimney 13, extending into the flue 14. A portion of the heat generated by the lamp 12 and the fumes generated by the lamp 12 pass vertically into the flue 14 and thence horizontally through the flue 15 and pipe-section 16 into and through the drum 5, then vertically through the flue-pipe 17, having the closure 18 at its upper end, about which the openings 19 permit the heat and the fumes to pass into the vertical flue 20. The heat and fumes of the lamp are thence conducted horizontally through the pipe 21 to and through the T extension 22, which is on the exterior of the brooder. The lamp 12 has seated around its burner the heat-deflector 23, whose function is to deflect the heat of the burner from the body of the lamp, thus keeping the oil cool.

As shown in the drawings, the lamp is provided with the housing 24, which is necessary in outdoor but dispensed with in indoor brooders. The housing 24 is provided with the air-opening 25. The warmth generated by the lamp serves to heat the volume of fresh air admitted to the housing 24 through the opening 25, and a portion thereof arises through the outer concentric flue 26 and thence horizontally through the connecting outer flues 27 and 28 to the interior of the hover 5.

Within the hover 5 I have provided a thermostat 29, which actuates by its expansion and contraction the bar 10 by means of the connecting-rod 30. The bar 10 is pivotally mounted in the yoke 31 on the upper side of the hover-top 1 and is provided at its outer end with the counterbalancing-weight 32. The bar 10 is provided at or near its fulcrum with a shield 33. The upper end of the connecting-rod 30 extends loosely through the shield 33 and is screw-threaded and provided with the adjusting-nut 34. A thermometer 35 is seated in the hover through the opening 36 in the hover-top 1. The thermostat 29 is mounted on the bracket 37, to which at its end the bar 38 is pivotally fulcrumed. Midway its length the bar 38 is actuated by the thermostat 29, and at its other end it is connected to the bar 10.

The hover-top 1 is adjustably connected to the standards 2 by the thumb-screws 39, in order that it may be raised or lowered to accommodate various sizes of chicks. The vertical flue 20 and T extension 22 are open at their bottoms to secure sufficient draft. The housing 24 is provided with a door 40 to admit the removal and replacement of the lamp 12. The flue 15 is removably fitted into the pipe-section 16, and the flue 27 is removably fitted into the flue 28. The hover-top 1 may when desired be provided with an air-tight heat-retaining ring 41.

By the described means I have provided a hover which may be mounted in any suitable structure to form a brooder, or it may be used as an outdoor brooder and when so used is complete in itself. It may be readily removed from the interior of the brooder-house when desired, and the top being adjustable it may be gradually elevated as the chicks grow and again lowered to accommodate newly-hatched chicks. The temperature within the hover is susceptible of accurate regulation and may be gradually lowered with the growth of the chicks. It is obvious that one lamp may be connected to supply heat to two or more hovers without departing from my invention. By means of the construction employed in the flue 20 and T extension 22 I have further provided means whereby the lamp cannot be extinguished by a downdraft. The bracket 37 is suspended from the base of the yoke 31 by means of the hanger 42, which is tubular in form and through which the bar 10 extends.

Having thus described my invention, what I claim as new, and desire to have secured to me by the grant of Letters Patent, is—

1. In a hover, the combination with a suitable source of heat-supply of a drum mounted within the hover, an inner flue, 16, extending from the exterior of the hover to the interior of the drum, an outer flue, 28, extending from the exterior of the hover to the interior of the hover, and heat-supply pipes extending from the source of heat-supply to the hover and adapted to removably fit respectively into the inner flue, 16, and outer flue, 28, substantially as specified.

2. In a hover, a hover-top, a drum mounted beneath the hover-top, a lamp, a flue extending from the lamp to the interior of the drum, a concentric flue adapted to convey heated air to the interior of the hover, a vertical flue extending from the interior of the drum to the exterior of the hover, and a pipe loosely inclosing the last-named flue and extending to the exterior of the hover-top, and a T extension mounted upon the outer end of said pipe, substantially as specified.

In testimony whereof I have signed my name to this specification in presence of two subscribing witnesses.

JAMES LOVE NIX.

Witnesses:
H. H. SCOTT,
B. B. McCONNAUGHEY.